United States Patent [19]
Maimets et al.

[11] Patent Number: 5,119,862
[45] Date of Patent: Jun. 9, 1992

[54] CONDUIT REPAIR APPARATUS

[75] Inventors: Lembit Maimets, Toronto; Warwick D. Meadus, Mississanga, both of Canada

[73] Assignee: Link-Pipe Techlnogies, Inc., Toronto, Canada

[21] Appl. No.: 651,793

[22] Filed: Feb. 7, 1991

Related U.S. Application Data

[63] Continuation of Ser. No. 264,376, Oct. 31, 1988, abandoned.

[51] Int. Cl.⁵ .............................................. F16L 55/16
[52] U.S. Cl. ........................................ 138/98; 138/97; 405/150.1
[58] Field of Search ................... 138/97, 98, 128, 166; 166/285, 277, 387; 405/150, 154

[56] References Cited

U.S. PATENT DOCUMENTS

| Re. 30,929 | 5/1982 | Maimets . |
|---|---|---|
| 2,583,316 | 1/1952 | Bannister . |
| 3,279,503 | 10/1966 | Carbone et al. . |
| 3,642,032 | 2/1972 | Cook et al. . |
| 3,678,560 | 7/1972 | Dufour et al. . |
| 3,700,265 | 10/1972 | Dufour et al. . |
| 4,009,063 | 2/1977 | Wood . |
| 4,092,193 | 5/1978 | Brooks .................... 138/98 |
| 4,109,684 | 8/1978 | Fernandez . |
| 4,124,985 | 11/1985 | Maimets . |
| 4,257,459 | 3/1981 | Jenks . |
| 4,346,922 | 8/1982 | Ohtsuga et al. . |
| 4,347,018 | 8/1982 | Wrightson et al. . |
| 4,361,451 | 11/1982 | Renaud . |
| 4,442,153 | 4/1984 | Meltsch . |
| 4,501,153 | 2/1985 | Retz . |
| 4,581,801 | 4/1986 | Kobuck . |
| 4,589,447 | 5/1986 | Kane et al. . |
| 4,647,072 | 3/1987 | Westman . |
| 4,767,236 | 8/1988 | Rice . |
| 4,897,135 | 1/1990 | Aylor et al. ......................... 138/98 |

FOREIGN PATENT DOCUMENTS

| 0015559 | 9/1980 | European Pat. Off. . |
|---|---|---|
| 2136912 | 9/1984 | United Kingdom . |

Primary Examiner—James E. Bryant, III
Attorney, Agent, or Firm—Sandler, Greenblum & Bernstein

[57] ABSTRACT

A pipe repair sleeve and liner with interlocking elements in a form of a coiled sheet which is covered with compressive gasket. An air bag is inserted into the coiled sleeve and moved to the location of the damaged pipe. Once in place, the air bag is inflated. As a result of the inflation, the repair sleeve uncoils and the surrounding gasket is compressed against the damaged pipe. When the air bag is deflated, the sleeve begins to coil and forces a male end of the sleeve into the female end forming a male and female interlocking continuous sleeve inside the pipe. After the repair sleeve is installed in the pipe, the air bag is removed from the sleeve.

34 Claims, 5 Drawing Sheets

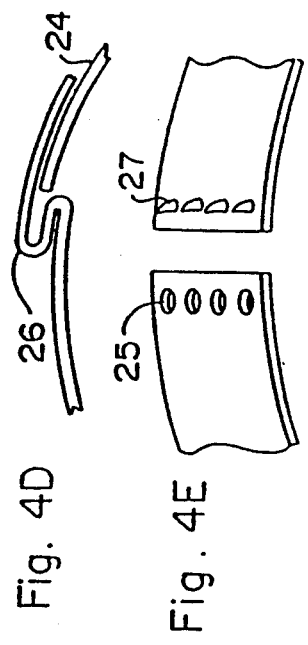
Fig. 4D
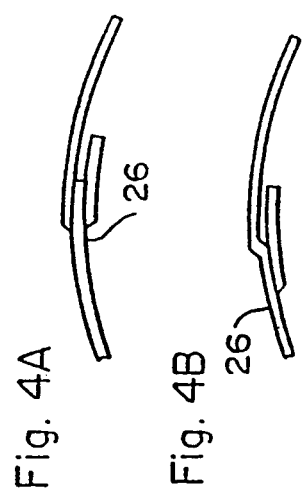
Fig. 4E
Fig. 4A
Fig. 4B
Fig. 4C
Fig. 4F
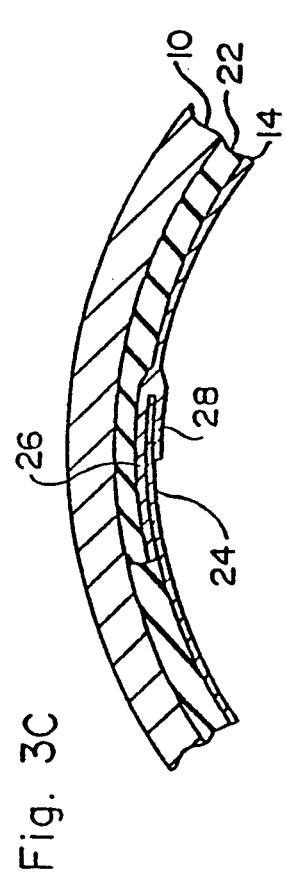
Fig. 3C
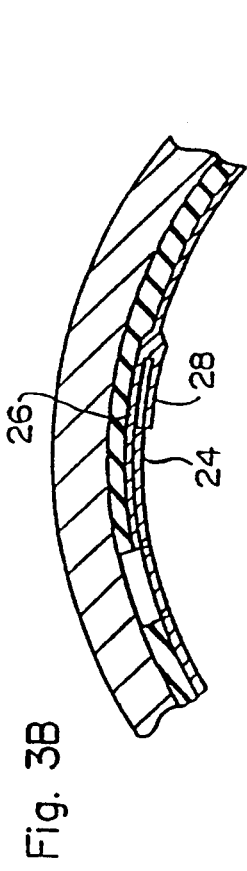
Fig. 3B
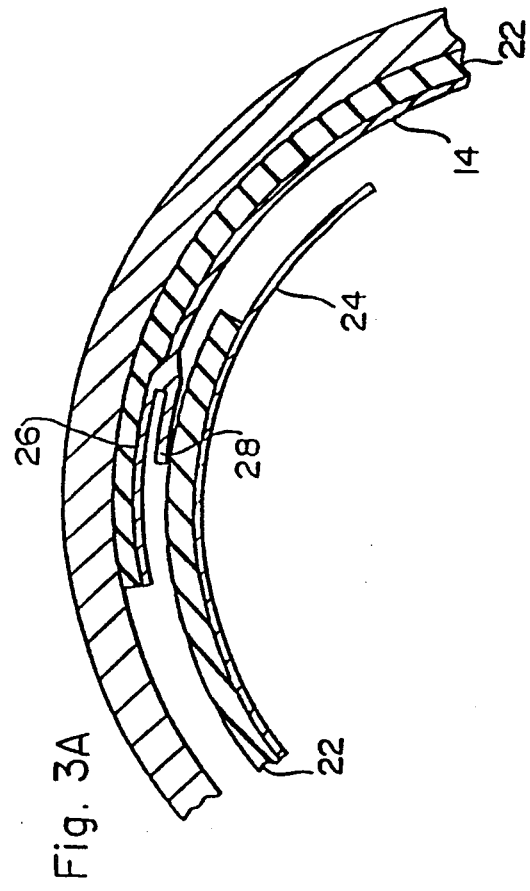
Fig. 3A

5,119,862

CONDUIT REPAIR APPARATUS

This application is a continuation of application Ser. No. 07/264,376, which was filed on Oct. 31, 1988 and is now abandoned.

BACKGROUND OF THE INVENTION

1. Field of the Invention

The present invention generally relates to a pipe repair sleeve and method of repairing pipes, tunnels, conduits and other similar structures as well as to a method for repairing underground pipes by inserting an expandable sleeve inside the pipe and expanding the same to seal, a damaged or leaking portion of the pipe.

2. Description of Background and Material Information

Conventionally underground pipes, tunnels, conduits and similar structures may be repaired in various ways.

One method involves forcing a sealing fluid under pressure into the pipe lining through the damaged portion in the pipe.

Another method involves coating the interior of the underground pipe with a sealing material in order to repair the damaged portion of the pipe.

Other conventional methods include procedures wherein a rigid pipe is installed within an existing pipeline and wherein sleeving elements are used in order to expand the same against the inner part of the underground pipes.

British Patent 2,136,912, BARRY, discloses a method of sealing pipes having a sleeve impregnated with a curable resin which is then placed around an inflatable and collapsable bag. The sleeve and bag are attached to a pulling line and introduced into the damaged part of the pipe. The bag is inflated, thereby expanding the fiber glass laminate sleeve into pressure contact with the inner wall of the pipe. After the resin hardens, the bag is collapsed and moved.

U.S. Pat. No. 4,589,447, CANE et al., discloses a method of inserting a coiled element into damaged tunnel or conduit. When the coil element is positioned at a damaged location, the coil element unwinds and expands outwardly forcing the sleeve on its outer surface against the wall of the conduit and seals the damaged portion of the tunnel.

U.S. Pat. No. 4,581,801, KOBUCK et al., discloses a method which uses a metal sleeve 16 and an expander element 24 which are both inserted into a pipe. The expander element causes a sleeve to expand against the inner surface of the tube.

U.S. Pat. No. 4,347,018, WRIGHTSON et al., discloses a method of repairing the lining of tunnels, conduits and the like, wherein an overlapped pipe is inserted into the tunnel. The steps holding the pipe in its hold-up state are released forcing the pipe to extend.

U.S. Pat. No. 4,361,451, RENAUD, discloses a lining arrangement wherein a lining sleeve and inflatable envelope having a layer of resin therebetween are introduced into a conduit. The envelope is inflated and forces the sleeve against the inner wall of the conduit.

None of these prior art arrangements, however, discloses the pipe repair apparatus and method, in accordance with the present invention, as disclosed and claimed in more detail hereinbelow.

SUMMARY OF THE INVENTION

Accordingly, it is a general object of the present invention to provide a new and improved pipe repair sleeve and method of repairing underground pipes, tunnels, conduits and other similar structures.

Another object of the present invention is to provide a new and improved underground pipe repair method which minimizes the labor required and the necessary time for repairing the same.

A further object of the present invention is to provide a new and improved internal pipe repair sleeve which expands and locks in position inside the pipe structure to seal a damaged or leaking part of the pipe.

These and other objects of the invention are achieved using a coiled repair sleeve having edges with locking members which is expanded, for example, by means of an air bag inserted into the coil of sheet material, covered with elastic gasket material, which forms the sleeve. The repair sleeve with the air bag inserted is moved to the location of the damage or leak; upon reaching the site of the damage, the air bag, or other means of expansion, is inflated or otherwise expanded so as to uncoil the sleeve and compress the gasket material against the inside of the pipe. When the air bag is then deflated, the uncoiled sleeve retracts to a certain degree due to its spring-type property and the elasticity of the gasket material. As this happens, the male locking member of the sleeve slips into the groove of the female locking member of the sleeve to form a continuous interior sleeve inside the pipe. After deflating, the air bag is removed from the pipe structure.

Thus, the present invention is directed to a generally elongate member with interlocking longitudinal edges, including a sheet of material having two longitudinal edges, and means for locking associated with the longitudinal edges, adapted to fasten the longitudinal edges of the sheet together to form the sheet into a generally tubular configuration, wherein the sheet is composed of flexible material, preferably selected from the group consisting of metal and plastic, and more preferably metal, and preferably wherein the sheet is coiled. The means for locking includes a male locking member and a female locking member adapted to mate with the male locking member.

Preferably, the male locking member includes an elongate element having a predetermined length and the female locking member includes an outer lip having a length substantially equal to the length of the male locking member and an inner lip having a length shorter than the length of the length of the outer lip.

More particularly, the present invention is directed to a pipe repair liner including a sleeve having an outer surface, having a structure substantially as described above, provided with a covering on at least a portion of the outer surface of the sleeve wherein the covering is composed of a compressible material, preferably selected from the group consisting of plastic and rubber, wherein the plastic is a plastic foam, such as polyethylene foam. Preferably, the covering is a gasket and, preferably, the exterior surface of the outer lip of the female locking member is covered with the gasket material.

In a preferred embodiment, the present invention is directed to a pipe repair apparatus including a sleeve in the form of a coil which is provided with a covering on at least a portion of the outer surface of the sleeve having a structure substantially as described above, in addition to means for expansion inserted in the coil adapted to compress the covering against the inside of a pipe into which the pipe repair liner is placed and, preferably, wherein the means for expansion is an expandable air bag which may be pleated.

In addition, the present invention is also directed to a method of repairing pipes, tunnels, conduits, or similar structures having damaged sections in the form of cracks, leaks, holes, or eroded surfaces and the like which involves providing a pipe repair apparatus, as described above, inserting the pipe repair apparatus in a pipe; expanding the means for expansion to uncoil the sheet of coiled material to compress its covering or gasket against the inside of the pipe; retracting the means for expansion to permit the locking members associated with the longitudinal edges of the sheet to lock the sheet into a rigid tubular configuration lining the pipe.

BRIEF DESCRIPTION OF DRAWINGS

The above and other objects, features and advantages of the present invention are detailed hereinafter with respect to the accompanying drawings, in which like reference characters are used to describe corresponding parts throughout the several views, and wherein:

FIG. 3A is a cross-sectional view of the sleeve member in partially expanded position;

FIG. 3B is a cross-sectional view of the sleeve member wherein a male edge is snapped into female edge position;

FIG. 3C is a cross-sectional view of the sleeve member in complete interlocking engagement;

FIG. 4A is a cross-sectional view of welded female edge of the sleeve member;

FIG. 4B is a cross-sectional view of stamped and welded female edge of the sleeve member;

FIG. 4C is a cross-section view of stamped female edge of the sleeve member;

FIG. 4D is a cross-sectional view of rolled female edge of the sleeve member;

FIG. 4E is a perspective view of female and male edges with a line of slots and studs respectively;

FIG. 4F is a cross-sectional view of the embodiment of FIG. 4E;

DETAILED DESCRIPTION OF THE DRAWINGS

Figure 2:
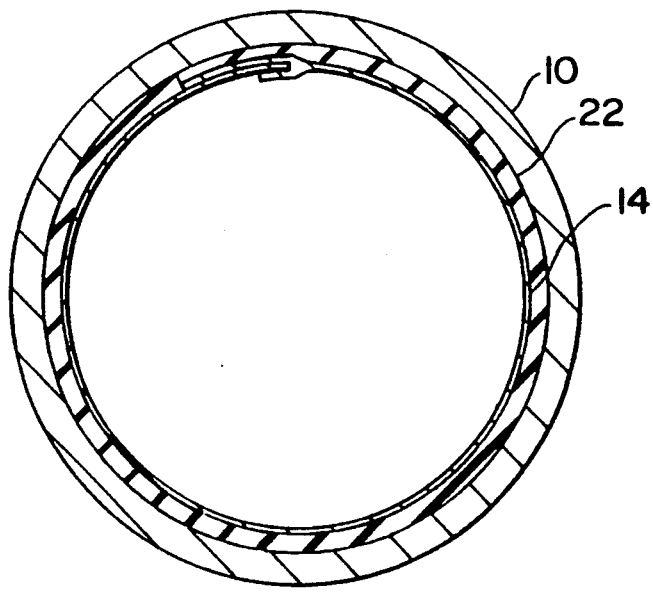
FIG. 2 is a cross-sectional view in elevation of the sleeve member in the expanded and interlocking position.

The present invention will now be described in greater detail with reference to the embodiments illustrated in the drawings.

Figure 1:
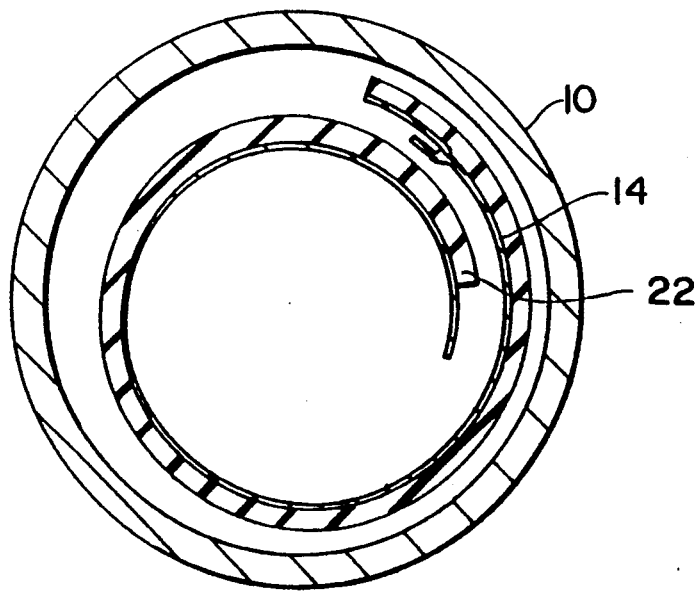
FIG. 1 is a cross-sectional view in elevation of a sleeve member in partially expanded position.

More specifically, FIG. 1 illustrates the sleeve 14, preferably made of material which is elastic or tensioned, such as metal, to form a spiral, coil or spring-type structure. The sleeve is covered by a compressible material 22, the compressible covering material is preferably in the form of a gasket, made of plastic, rubber or other elastic material such a plastic foam, e.g. polyurethane foam. As shown, sleeve 14 and gasket 22 are inserted in the pipe 10.

FIG. 2 shows the structure of sleeve 14 with its longitudinal edge locked in position to compress gasket 22 tightly against the interior wall of pipe 10.

A cross-section of the male-female interlocking arrangement of the pipe repair sleeve 14 is illustrated in FIGS. 3A, 3B and 3C. As shown in FIG. 3A, the longitudinal male locking member 24 has an exterior surface which is exposed or uncovered by the material of gasket 22 over a portion of its length which corresponds to female locking member 26 having an exterior surface which is covered by compressible gasket 22. In another embodiment, the gasket 22 can be continued throughout the entire length of the male locking member 24. Although the thickness of the gasket material can be substantially the same over the entire exterior surface of the sleeve member, if the exterior surface of the male locking member is covered, the gasket material is preferably thinner than the cover over the other portions of the exterior surface of the sleeve member and is designed primarily to ensure water tightness, preferably utilizing easily compressible material such as low density polyethylene foam or foam rubber.

In order to allow for the engagement of the male locking member 24 and the female locking member 26, a wider female groove than otherwise would be required is utilized where the outer surface of the male locking member is covered with the gasket material. As shown, the female locking member includes an outer lip having a length, substantially corresponding to the uncovered portion of the male locking member having the previously mentioned exterior surface 26 covered by the gasket material and an interior or lower lip 28 which is preferably shorter in length than the length of the outer lip. As a result of the pressure by the air bag or other means for expansion, the sleeve 14 is expanded to an oversized configuration, i.e., wherein the male locking member slides over the interior surface of the lower lip to a point beyond the edge of the lower lip. When the air bag is deflated, the sleeve 14, due to its spring-type property, coils so that male locking member 24 of the sleeve 14 is snapped into a groove of female locking member 26 of the sleeve as shown in FIG. 3B. After the deflation is completed and the air bag removed from the sleeve, male locking member 24 and female locking, member 26 of the sleeve 14 are completely interlocked forming a continuous sleeve inside the pipe 10, as shown in FIG. 3C.

Alternative structural embodiments of the female locking member of the sleeve 14 are illustrated in FIGS. 4A, 4B and 4C. The female locking member formed as a groove, can be welded as shown in FIG. 4A; stamped, as shown in FIG. 4C; or stamped and welded, as illustrated in FIG. 4B; or rolled, as shown in FIG. 4D.

FIG. 4E illustrates an embodiment wherein the female edge has a series of slots 25 and male edge with a series of protrusions in the form of hooks or studs 27. This embodiment is particularly preferred where one wishes to have the edges of the sleeve member fastened together. Thus, the stud-slot fastening assembly can be used in the embodiments described herein, in which the elongate male member engages within the groove of the female member, or may be the sole means for interconnecting the edges of the sleeve to hold the same in a tubular configuration once the force of expansion is released. Thus, when the air bag is inflated, the male edge 24 uncoils and aligns with female edge 26 so that the series of protrusions hooks or studs slip into a series of slots. When the air bag is deflated, the protrusions 27 are hooked in the slots 25 and remain firmly engaged in a locking position.

A cross-section of the female male and edges, with slots 25 and protrusions or studs 27, respectively, is shown in FIG. 4F.

Figure 5:
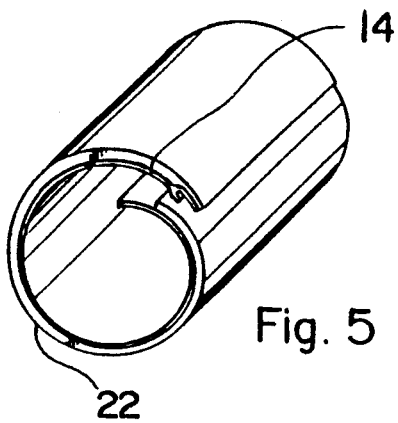
FIG. 5 is a perspective view of internal pipe repair sleeve in the form of a coiled sheet.

FIG. 5 shows a pipe repair sleeve 14 in the form of coiled sheet made of metal or any other rigid material capable of being tensioned into a spring, spiral or coil. The exterior surface of the sheet is covered with a covering 22 made of plastic rubber, or other compressible material which is preferably elastic, to function as a gasket. The gasket may be made of any elastic material such as plastic or rubber, but is preferably made of polyethylene foam.

Figure 6:
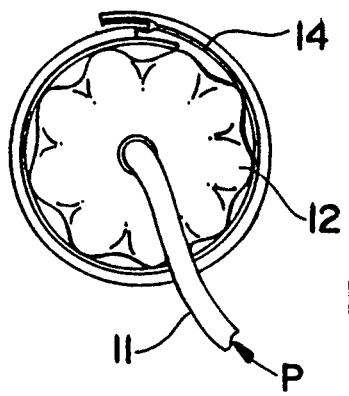
FIG. 6 is an end-view in elevation of the partially inflated air bag inserted into the sleeve.
Figure 7A:
FIG. 7A is a schematic view of an air bag and pressure source.
Figure 7B:
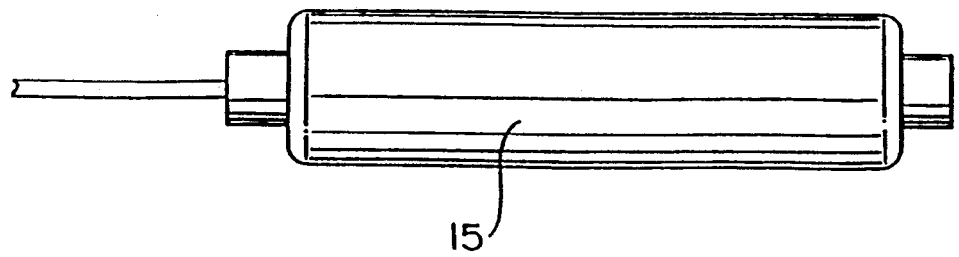
FIG. 7B is a schematic view of an alternative air bag to that shown in FIG. 7A.

FIG. 6 illustrates the prepared means for expanding the sleeve 14. As shown, an air bag 12 is inserted into the coiled sleeve 14; air is introduced through a hose 11 which inflates the air bag and which expands to compress against the interior of sleeve 14, which uncoils the sleeve. The structure of air bag 12 with pleated sides is shown in schematic in FIG. 7A and the structure of an expandable plastic bag or balloon-like configuration 15 is shown in schematic in FIG. 7B.

Figure 8A:
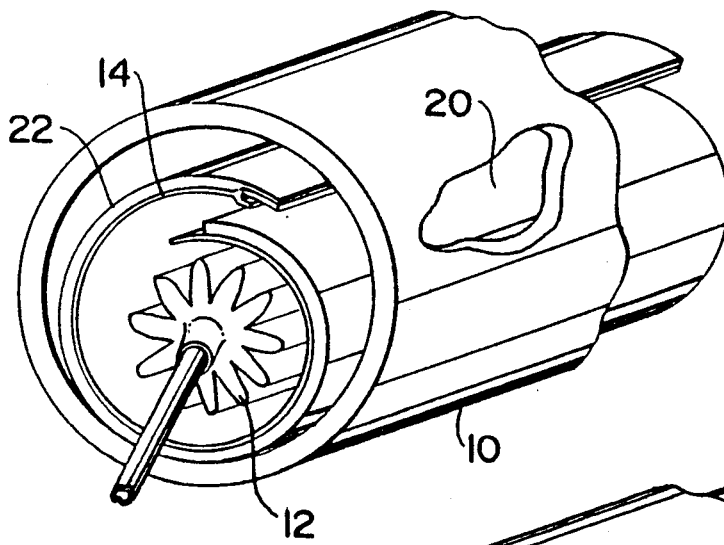
FIG. 8A is a perspective view of internal pipe repair sleeve and liner with the air bag in deflated position inserted into the damaged sleeve.
Figure 8B:
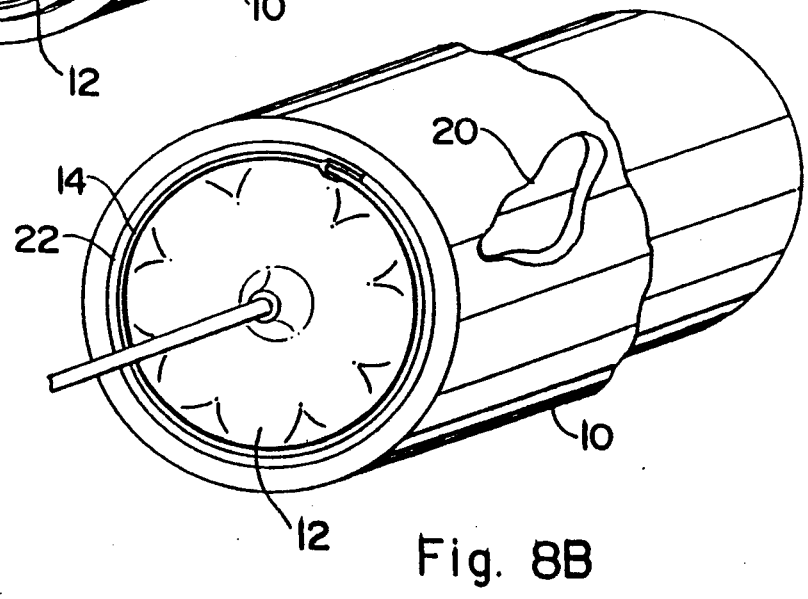
FIG. 8B is a perspective view of internal pipe repair sleeve in expanded position with inflated air bag in the damaged pipe.
Figure 8C:
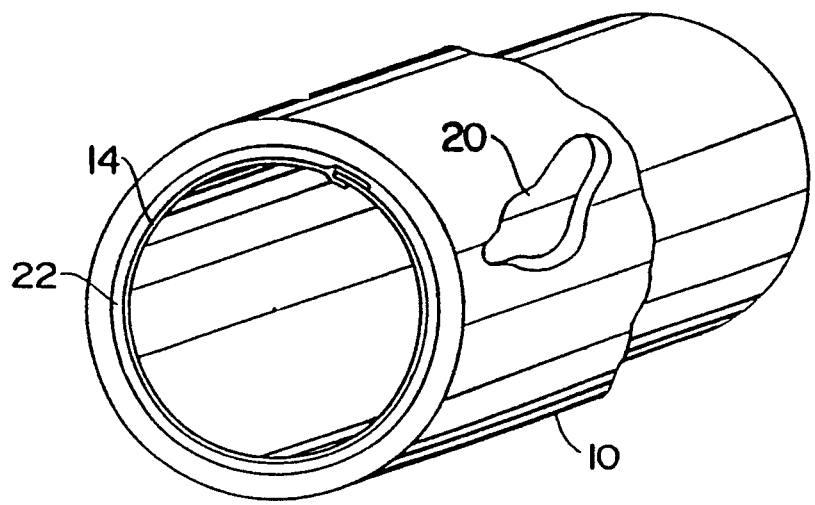
FIG. 8C is a perspective view of internal pipe repair sleeve in the complete interlocking engagement forming a continuous interior sleeve inside the damaged pipe.
Figure 9:
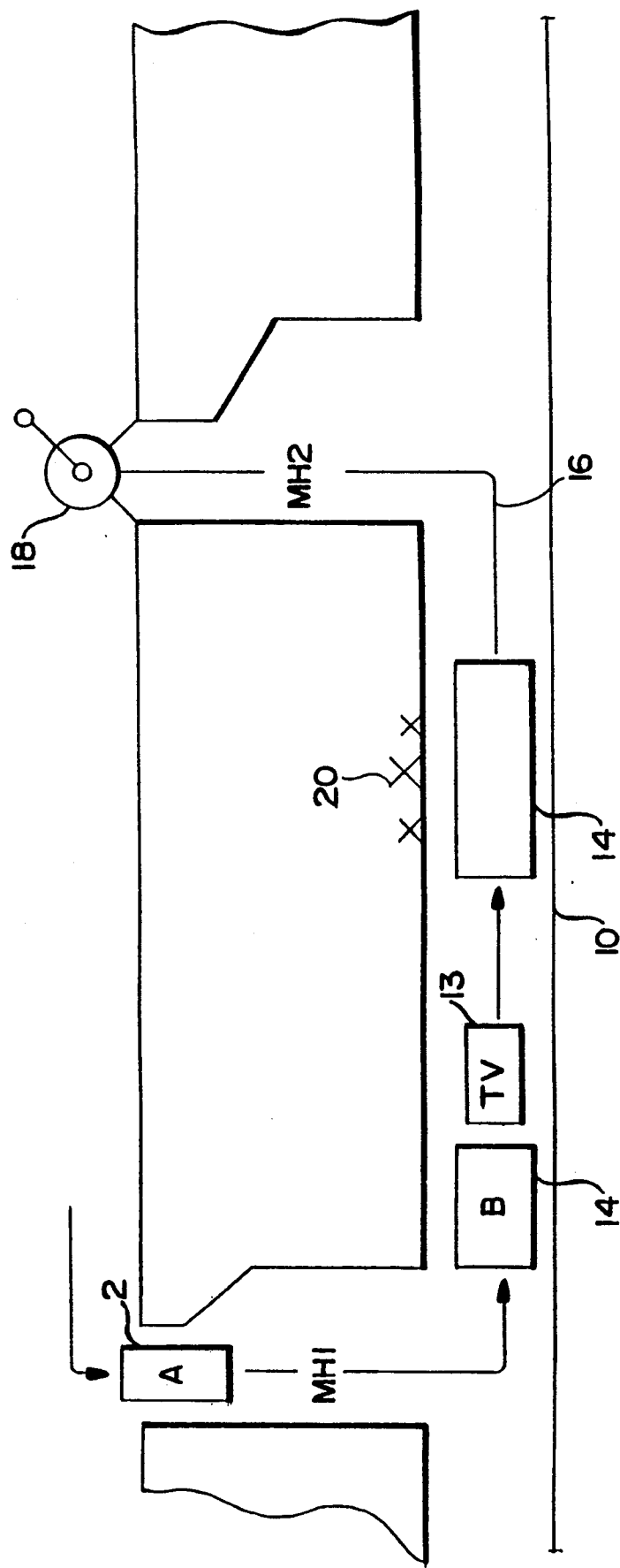
FIG. 9 illustrates the installation process of internal pipe repair sleeve and liner in the damaged pipe at location of damage or leak.

In FIGS. 8A, 8B, and 8C, the pipe repair sleeve 14 and pipe 10 to be repaired are shown, in perspective, in three successive steps in the method of repairing underground pipes, tunnels, conduits or similar structures. FIG. 9 schematically illustrates the pipe repair sleeve 14 with inserted air bag (not shown) at location A, which is moved to the damaged pipe 10 through an existing manhole or, in its absence an excavated hatch MH1. The sleeve is inserted into the end of the pipe 10 at location B. In order to assist in the detection of the place of damage or leak, a TV or equivalent camera 13 is placed in front of the sleeve 14. Once the sleeve 14 has been positioned at the place of damage 20, as shown in FIGS. 8A and 9, the air bag 12, which can be smooth and expandable is inflated to expand against the interior and coil the sleeve as shown in FIG. 8B. As discussed above, FIG. 8C illustrates the pipe repair sleeve, wherein the air bag is deflated; removed from the sleeve; and the male and female ends of the sleeve are completely interlocked, performing a continuous interior sleeve inside pipe 10. The air bag 12, removed from the sleeve, and TV camera 13 are both removed by the cable 16 through man hole or hatch MH2 using winch 18 as illustrated in FIG. 9.

From the foregoing description, one skilled in the art can easily ascertain the essential characteristics of this invention and, without departing from the spirit scope thereof, can make various changes and modifications of the invention adapted to various usages and conditions.

What is claimed is:

1. A conduit repair apparatus comprising:
   (a) a sleeve member comprising:
      (i) an outer surface;
      (ii) a sheet of material having a first longitudinal edge and a second longitudinal edge;
      (iii) means for locking said first longitudinal edge and said second longitudinal edge of said sheet to form said sheet into a generally tubular configuration;
   (b) a compressible covering on at least a portion of said outer surface of said sleeve member, said compressible covering having a first longitudinal edge portion and a second longitudinal edge portion, and extending generally from said first longitudinal edge portion of said compressible covering, in an area proximate said first longitudinal edge of said sleeve member, to said second longitudinal edge portion of said compressible covering, in an area proximate said second longitudinal edge of said sleeve member, said covering and said sleeve being positioned in the form of a coil, in which said first longitudinal edge portion of said compressible covering and said first longitudinal edge of said sleeve overlap said second longitudinal edge portion of said compressible covering and said second longitudinal edge of sleeve, respectively, said covering and said sleeve being movable to an expanded, installed position against the interior of a conduit to be repaired and against which the cover is compressed; and
   (c) means for expanding said covering and said sleeve to said expanded, installed position after insertion of said covering and sleeve into a conduit into which the conduit repair apparatus is placed.

2. The conduit repair apparatus in accordance with claim 1, wherein said means for expanding is an air bag.

3. The conduit repair apparatus in accordance with claim 2, wherein said air bag is pleated.

4. The conduit repair apparatus in accordance with claim 1, wherein said sheet comprises a flexible material.

5. The conduit repair apparatus in accordance with claim 4, wherein said flexible material is metal.

6. The conduit repair apparatus in accordance with claim 4, wherein said flexible material is plastic.

7. The conduit repair apparatus in accordance with claim 1, wherein said means for locking comprises a male locking member, and a female locking member adapted to mate with said male locking member.

8. The conduit repair apparatus in accordance with claim 7, wherein said male locking member comprises an elongate element having a predetermined length and said female locking member comprises an outer lip having a length equal to the length of the male locking member and an inner lip having a length shorter than the length of the outer lip.

9. The conduit repair apparatus in accordance with claim 1, wherein said compressible material is selected from the group consisting of plastic and rubber.

10. The conduit repair apparatus in accordance with claim 9, wherein said plastic is a plastic foam.

11. The conduit repair apparatus in accordance with claim 10, wherein said plastic foam is polyethylene.

12. The conduit repair apparatus in accordance with claim 1, wherein said covering is a gasket.

13. The conduit repair apparatus in accordance with claim 9, wherein said exterior surface of said outer lip of said female locking member is covered with said covering.

14. A conduit repair apparatus comprising:
(a) a sleeve having a first longitudinally extending edge portion, a second longitudinally extending edge portion, and an outer surface;
(b) a compressible covering positioned on said outer surface of said sleeve for co-movement with said sleeve, said compressible covering extending generally from aid first longitudinally extending edge portion of said sleeve to said second longitudinally extending edge portion of said sleeve, wherein said sleeve and said covering form a composite liner being in a coiled, pre-expanded position and being movable to an uncoiled, expanded position;
(c) means for securing said first longitudinally extending edge portion and said second longitudinally extending edge portion of said sleeve in said uncoiled expanded position; and
(d) means for insertion within said composite liner and for applying an internal force within said sleeve for expanding said composite liner from said coiled, pre-expanded position to said uncoiled, expanded position.

15. The conduit repair apparatus of claim 14, said means for securing comprising a longitudinally extending groove formed at said first longitudinally extending edge portion of said sleeve for receiving at least a portion of said second longitudinally extending edge portion of said sleeve.

16. The conduit repair apparatus of claim 15, said compressible covering being omitted from said portion of said second longitudinally extending edge portion of said sleeve, said second longitudinally extending edge portion of said sleeve being receivable with said longitudinally extending groove of said first longitudinally extending edge portion of said sleeve.

17. The conduit repair apparatus of claim 10, said sleeve having a predetermined thickness and said longitudinally extending groove of said first longitudinally extending edge portion of said sleeve having a width substantially equal to said predetermined thickness.

18. The conduit repair apparatus of claim 14, said compressible covering having a predetermined thickness and being resiliently compressible to a lesser thickness than said predetermined thickness.

19. A conduit repair apparatus comprising:
(a) a sleeve comprising a single member movable from a coiled position to an uncoiled position and having a first longitudinally extending edge portion, a second longitudinally extending edge portion, and an outer surface, said first longitudinally extending edge portion having a longitudinally extending groove;
(b) a compressible covering, covering said outer surface of said sleeve, said covering extending generally from said first longitudinally extending edge portion of said sleeve to said second longitudinally extending edge portion of said sleeve, wherein said sleeve and said covering are movable in unison and form a composite liner, said liner being in a coiled, pre-expanded position and being movable to an uncoiled, expanded position;
(c) means for securing said first longitudinally extending edge portion and said second longitudinally extending edge portion of said sleeve in said uncoiled, expanded position;
(d) means for insertion within said composite liner and for applying an internal force within said sleeve for expanding said composite liner from (1) said coiled, pre-expanded position to (2) a slightly over-expanded position, in which said second longitudinally extending edge portion of said sleeve is biased over said longitudinally extending groove of said first longitudinally extending edge portion of said sleeve and said compressible covering is adapted to be compressed against an interior surface of a conduit to be repaired, and to (3) said uncoiled, expanded position, in which said second longitudinally extending edge portion of said sleeve is received within said longitudinally extending groove of said first longitudinally extending edge portion of said sleeve.

20. A pipe repair apparatus for providing a liner for sealing a damaged or leaking pipe, tunnel, or conduit, said apparatus being placeable inside said damaged or leaking pipe, tunnel, or conduit, and including a generally elongate member with edges adapted to be fastened together to form a generally tubular configuration inside said damaged or leaking pipe, tunnel, or conduit for repairing the same, said pipe repair apparatus comprising:
(a) a sleeve member having an outer surface, said sleeve member comprising:
(i) a sheet of material having two longitudinally edges;
(ii) means for locking said longitudinal edges of said sheet to form said sheet into the generally tubular configuration; and
(b) a compressible covering mounted upon said outer surface of said sleeve member, said compressible covering having a first portion and a second portion, and extending generally from said first portion, in an area proximate one of said two longitudinal edges of said sleeve member, to aid second portion, in an area proximate a second of said two longitudinal edges of said sleeve member, said covering and said sleeve being in a coiled position, in which said first portion of said compressible covering and said one edge of said sleeve overlap said second portion of said compressible covering and said second of said edges of said sleeve, respectively, and being movable to an expanded, installed position.

21. An apparatus according to claim 20, said sheet comprising a flexible material selected from the group consisting of metal and plastic.

22. An apparatus according to claim 21, said sheet being coiled.

23. An apparatus according to claim 20, said means for locking comprising a male locking member and a female locking member adapted to mate with said male locking member.

24. An apparatus according to claim 23, said male locking member comprising an elongate element having a predetermined length with an outer surface, and said female locking member comprising an outer lip with an outer surface having a length substantially equal to the length of said male locking member and an inner lip having a length shorter than the length of the outer lip.

25. An apparatus according to claim 24, wherein said outer surface of said sleeve includes said outer surface of said outer lip of said female locking member.

26. An apparatus according to claim 25, wherein said outer surface of said sleeve includes said outer surface of said male locking member.

27. An apparatus according to claim 26, said male locking member having a portion of said compressible covering mounted upon said male member, said portion having a thickness less than other portions of said compressible covering.

28. An apparatus according to claim 26, said compressible covering covering said outer lip of said female locking member.

29. An apparatus according to claim 20, said compressible covering comprising a material selected from the group consisting of plastic and rubber.

30. An apparatus according to claim 29, said plastic being a plastic foam.

31. An apparatus according to claim 30, said plastic foam being polyethylene.

32. An apparatus according to claim 20, further comprising means for expanding said covering and said sleeve from said coiled position to said expanded, installed position after insertion of said covering and said sleeve into said pipe, tunnel, or conduit into which said pipe repair apparatus is placed.

33. An apparatus according to claim 32, said means for expanding comprising an air bag.

34. An apparatus according to claim 20, said compressible covering being fixed upon and covering substantially the entirety of said outer surface of said sleeve member.

* * * * *